United States Patent [19]

Collet

[11] Patent Number: 5,117,672

[45] Date of Patent: Jun. 2, 1992

[54] MACHINES FOR STRAIGHTENING ELONGATE COMPONENTS SUCH AS ANODE RODS

[75] Inventor: Erwin Collet, Lunen, Fed. Rep. of Germany

[73] Assignee: Gewerkschaft Eisenhutte Westfalia GmbH, Fed. Rep. of Germany

[21] Appl. No.: 657,452

[22] Filed: Feb. 19, 1991

[30] Foreign Application Priority Data

Feb. 26, 1990 [DE] Fed. Rep. of Germany ....... 4005962

[51] Int. Cl.⁵ .............................. B21J 13/12
[52] U.S. Cl. .......................... 72/420; 72/457
[58] Field of Search ............... 72/374, 376, 416, 412, 72/420, 421, 422, 457

[56] References Cited

U.S. PATENT DOCUMENTS

| | | | |
|---|---|---|---|
| 1,308,593 | 7/1919 | Kendall | 72/420 |
| 2,221,539 | 11/1940 | Gehret | 72/420 |
| 3,051,216 | 8/1962 | Tomka et al. | 72/422 |
| 3,096,808 | 7/1963 | Holsteyn | 72/420 |
| 3,696,656 | 10/1972 | Nara et al. | 72/422 |
| 4,413,495 | 11/1983 | Peuhkurinen et al. | 72/422 |

Primary Examiner—Robert L. Spruill
Assistant Examiner—D. M. Gurley
Attorney, Agent, or Firm—Samuels, Gauthier & Stevens

[57] ABSTRACT

A machine for straightening anode rods has a portal-like frame through which the rods are transported in succession with the aid of a suspended rail coveyor. Jaws which engage on the sides of the rods are used to squeeze the rods. Beneath the jaws there is a rotatable fork which can engage and entrain with a shaped end piece on the lower end of one of the anode rods. The fork and its rotary drive is raised and lowered and guided for this reciprocal movement. An anode rod can thus be transposed through 90° enabling the jaws to squeeze against all the sides of the rod.

15 Claims, 2 Drawing Sheets 5,117,672

MACHINES FOR STRAIGHTENING ELONGATE COMPONENTS SUCH AS ANODE RODS

FIELD OF THE INVENTION

The present invention relates to a machine for straightening elongate components, such as anode rods.

BACKGROUND TO THE INVENTION

It is known from DE-PS-3541504, to treat anode rods by suspending the rods from a rail of a suspended-rail conveyor and by passing the rods between jaws which move to squeeze the rods therebetween. Normally, the rods have a rectangular cross-section and it is necessary partly to rotate each rod through 90° as the rod is being treated to enable the jaws to engage on all the side surfaces of the rod. It is also necessary to check the rod after treatment to ensure no damage has occurred to the rod or to its end piece. The latter is a metallic structure, like a spade, with nipples for fixing into a carbon block serving as an anode in electrolytic smelting plants.

An object of the invention is to provide an improved machine for straightening anode rods or the like.

SUMMARY OF THE INVENTION

In accordance with the invention, a rotary device or assembly with its own rotary drive means is positioned beneath the jaws of the machine. The device has an entrainer or locking mechanism which can be set from below onto an end piece of an anode rod, and can be raised and lowered by a reciprocating drive means. The rotary device is preferably constructed as a compact unit mounted on a cross beam of a portal-like frame of the machine. The entrainer of the rotary device can be raised and lowered to lock with the end piece of the anode rod and when locked the entrainer can be partly rotated or indexed through say, 90°, to turn the anode rod through alternative positions automatically to permit the jaws to act on all the side surfaces of the rod.

The rotary device which characterises the invention can be positioned in the location previously occupied in the known machine by a device used for checking the integrity of the nipples on the end piece of the anode rods.

The rotary device enables the anode rods to be treated efficiently and rapidly in succession.

The entrainer used to lock the rotary device on to the anode rod end piece also serves to support the anode rod during straightening with the jaws and also to prevent oscillations of the anode rods. As the entrainer is raised it is possible to rotate the entrainer so that it indexes into a position to receive the anode rod end piece. The reciprocating drive means can also be controlled to facilitate the overall process.

The entrainer may possess at least one fork piece with limbs or arms with a space therebetween for receiving the yoke of an anode rod end piece.

The entrainer can be fitted on a turntable driven by a rotary drive and which is raisable and lowerable. The rotary drive can be supported on another table, or similar structure, which is linked to one or more piston and cylinder units used to raise and lower the superadjacent sub-assembly.

Preferably, the device is additionally guided for its reciprocating up and down movements. The guide means for this purpose can act on the other support or table. In one design, the support table is fixed to a frame cross-beam which is provided with openings for receiving guide tubes of the guide means and/or the or each cylinder of the piston and cylinder unit(s).

According to the invention there is provided a machine for use in straightening elongate anode rods transported by a suspension-type conveyor, said machine comprising a frame for receiving the anode rods to be straightened, jaws for engaging on lateral sides of the anode rods, means for displacing the jaws to cause the latter to squeeze the rods and effect straightening, a rotary assembly provided with means for selectively engaging with end pieces of the anode rods to cause the rods to be rotatable with said assembly and means for raising and lowering the assembly. The rotary assembly serves partly to rotate each anode rod automatically and co-operates with the jaws in straightening the anode rod.

The invention may be understood more readily, and various other aspects and features of the invention may become apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
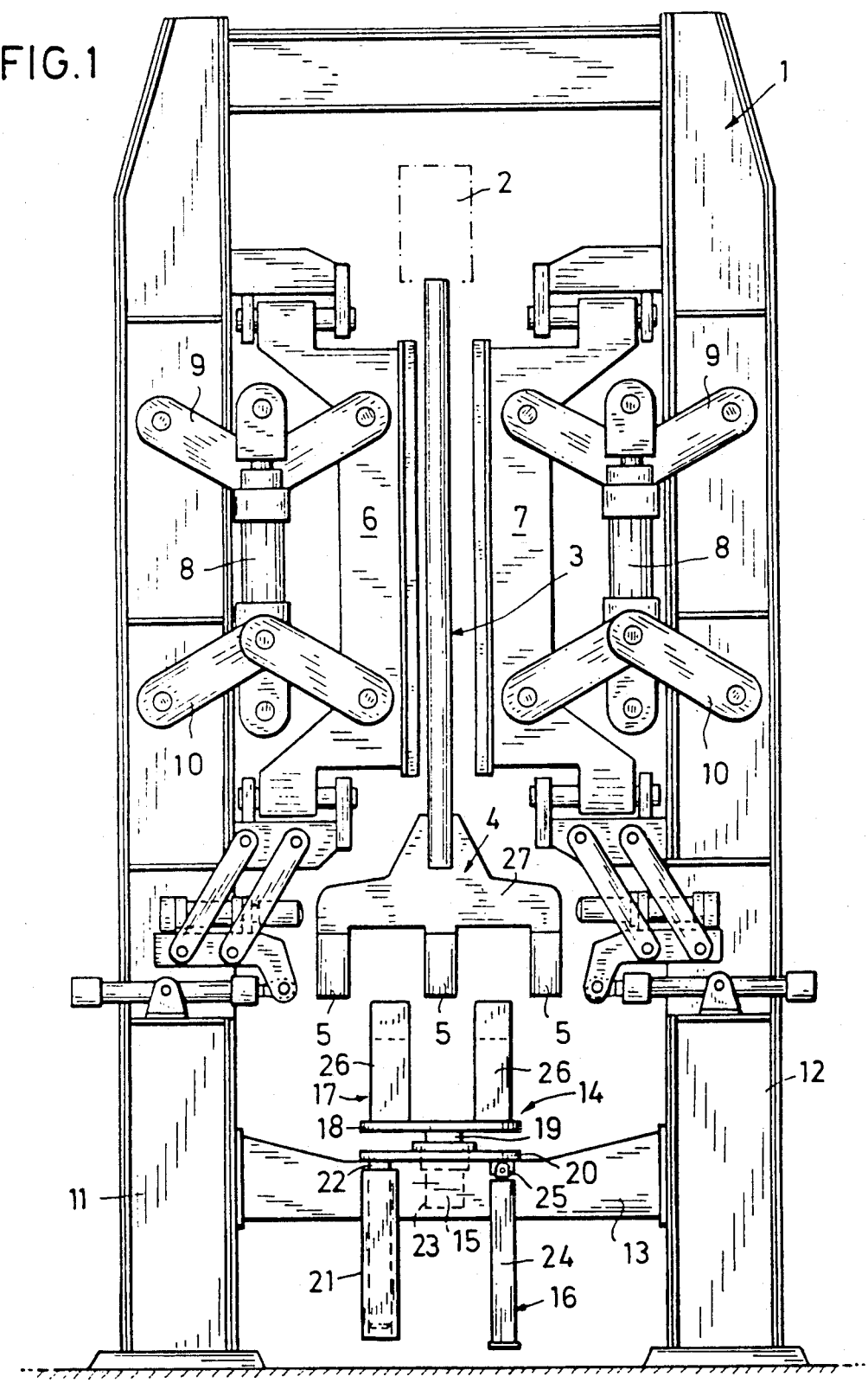
FIG. 1 is an schematic view of a machine constructed in accordance with the invention.

FIG. 1 depicts a machine constructed in accordance with the invention as seen in the direction in which anode rods 3 to be treated by the machine are transported along a rail of a suspended-rail conveyor. The machine itself is basically of the type described in DE-PS-3541504 and has a portal-like frame with side supports 11, 12 through which the suspended-rail conveyor (designated by reference numeral 2) transports a series of suspended anode rods 3. The conveyor may also be of the type described in DE-PS-3541504 with a rail from which rolling trolleys or carriages are suspended. The anode rods 3 are detachably mounted to the trolleys, preferably with rotary or universal joints.

If the rail is set at a gradient to the horizontal the trolleys can progress along the rail under gravitational force but if the rail is set substantially horizontally the trolleys can be connected to a traction member, such as an endless chain, which propels the trolleys along the rail.

The anode rods 3 are of the type which have endpieces 4 shaped with a yoke 27 and projections or nipples 5 for fixing to a carbon anode block (not shown) in a conventional manner. The anode rods 3 have a rectangular cross-section. In the frame 1, there are two vertical jaws 6, 7 which are displaceable relative to the rod 3 to be straightened. The jaws 6, 7 are each driven by drive means 8. Each drive means 8 is in the form of a double-action piston and cylinder unit coupled to the associated jaw 6, 7 via a guide-rod mechanism 9, 10 coupled to the supports 11, 12 of the frame 1. The piston-and-cylinder units are orientated parallel to the rods 3 to be straightened by the jaws 6, 7 and as the units extend or retract the mechanisms 9, 10 convert this longitudinal motion to lateral movement of the jaws 6, 7. Beneath the jaws 6, 7 there is a rotary device or assembly 14 provided with a rotary drive means 15 a reciprocating drive means 16 and a locking mechanism or entrainer 17. The device 14 is supported on a cross beam 13 connecting the supports 11, 12. The entrainer 17 is fixed on a turntable 18 mounted on a reciprocatable support table 20 with a rotary joint 19. The drive means 15 rotates the turntable 18 about the joint 19. The drive means 16, which can take the form of one or preferably several double-acting piston-and-cylinder units 24, serves to raises and lower the table 20 and thence the turntable 18 the rotary drive means 15 and the entrainer 17.

On the cross-beam 13 there are several fixed guide tubes 21 which receive guide rods 22 fixed to the table 20 so that the table 20 is guided as it is raised and lowered by the drive means 16. The tubes 21 pass through the cross-beam 13 and project downwardly therefrom. The cross-beam 13 has a central recess 23 for accommodating the rotary drive means 15 for the turntable 18 when the or each unit 24 is retracted.

Figure 2:
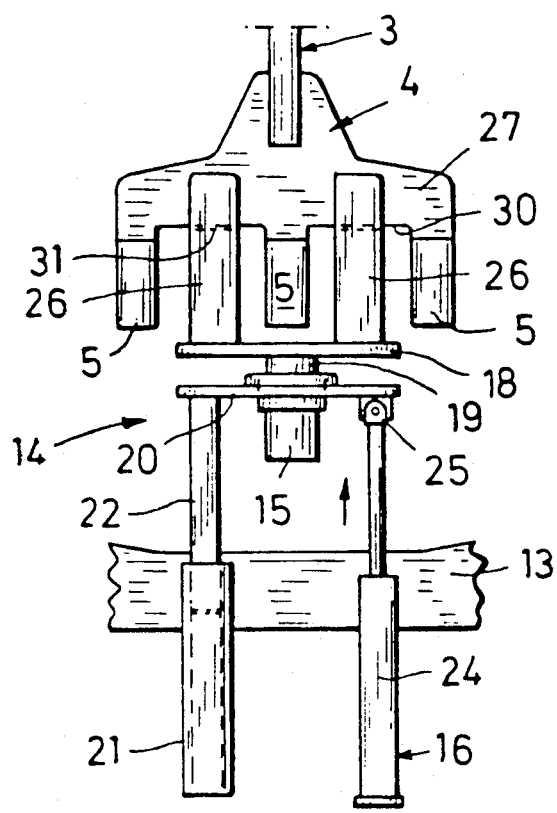
FIG. 2 and 3 are schematic views of a rotatable device of the machine, the views being taken on somewhat larger scale to FIG. 1.

The cylinders of the or each unit 24 can likewise be mounted on the cross-beam 13 so as to pass through the cross-beam 13 and project downwardly therefrom. The piston rod of the or each unit 24 is pivotably joined to a head piece 25 fixed to the underside of the table 20. The drive means 16 can be extended from the position shown in FIG. 1 to lift the other parts of the assembly 14 up to the position shown in FIG. 2 so that the entrainer 17 can engage the end piece 4 of an anode rod 3. The entrainer 17 is composed of a pair of fork pieces 26 fixed to the turntable 18. Each fork piece 26 has an opening for engaging on the yoke 27 of an end piece 4 of a suspended anode rod 3 between the nipples 5. In this way the upward movement of the parts of the assembly 14 causes the entrainer 17 to lock with the end piece of the anode rod 3 so as to transfer the rotary movement of the turntable 18 thereto. This is shown more clearly in FIGS. 2 and 3 which shows the turntable 18 transposed by 90°.

The anode rods 3 are straightened by squeezing between the jaws 6, 7 and by turning each of the anode rods 3 through 90° with the aid of the assembly 14 the jaws 6, 7 can be used twice to engage on all the sides of the rod 3.

Figure 3:
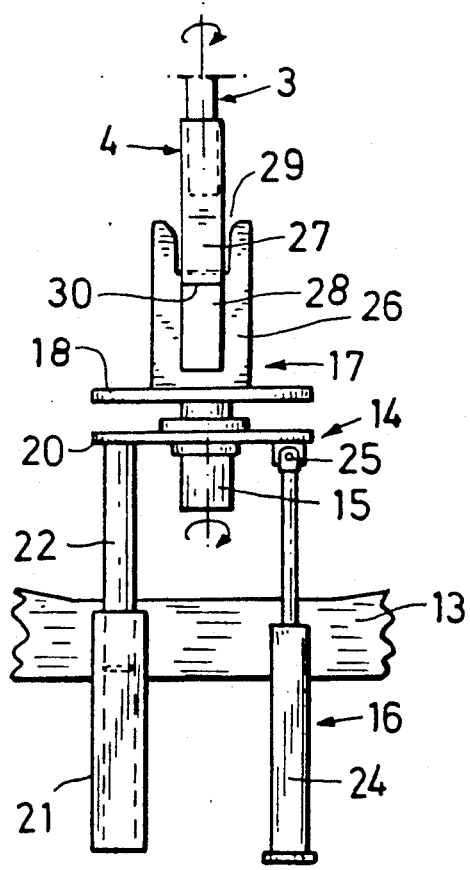

As shown in FIG. 3, the fork pieces 26 are preferably constructed so that the yoke 27 is well supported in the opening 28. The upper inner surfaces defining the opening 28 are preferably chamfered as shown to cause the opening 28 to widen outwardly. This makes it easier to slip the fork pieces 26 onto the yoke 27. When the assembly 14 is raised fully the yoke 27 may have its lower face 30 engaging a base surface 31 of each of the fork pieces 26.

During the straightening process, each rod 3 is transported into the machine and the parts of the assembly 14 is initially raised to locate the yoke 27 with the entrainer 17 as described. The rod 3 is then prevented from oscillating about its upper suspension joint by the entrainer 17. The jaws 6, 7 are then drawn together to effect a first straightening sequence. The jaws 6, 7 are then removed and the rod 3 is rotated through 90° with the rotary drive means 15 of the assembly 14. The jaws 6, 7 are then drawn together again. After the jaws 6, 7 have again been removed the assembly 14 can be lowered back into the position shown in FIG. 1 and the now-straightened anode rod 3 is transported away. The cycle is then repeated for the next rod 3.

Various modifications can be made to the machine without departing from the scope of the invention. For example, the entrainer 17 can be composed of a single forked piece for fitting on the central nipple 5 or three fork pieces for fitting on all the nipples 5.

I claim:

1. Machine for use in straightening elongate anode rods transported by a suspension-type conveyor; said machine comprising a frame for receiving the anode rods to be straightened, jaws for engaging on lateral sides of the anode rods, means for displacing the jaws to cause the latter to squeeze the rods and effect straightening, a rotary assembly provided with means for selectively engaging with end pieces of the anode rods to cause the rods to be rotatable with said assembly and means for raising and lowering the assembly; whereby the rotary assembly can partly rotate each anode rod automatically and co-operates with the jaws in straightening the anode rod.

2. A machine according to claim 1 wherein the frame has side supports and a lower cross piece and the rotary assembly is mounted on the lower cross beam.

3. A machine according to claim 1 wherein the means for selectively engaging with the end pieces of the anode rods serves to entrain with the end pieces as the assembly rotates.

4. A machine according to claim 1, wherein the means for selectively engaging with the end pieces of the anode rods is at least one forked piece with an opening into which the end piece of one of the anode rods is received.

5. A machine according to claim 4, wherein the opening is tapered to be larger towards the anode rod end piece.

6. A machine according to claim 1, wherein the rotary assembly at least includes a turntable carrying the means for selectively engaging with the end pieces of the anode rods and a rotary drive for rotating the turntable.

7. A machine according to claim 6 wherein the rotary drive is mounted on a support connected to the means for raising and lowering the assembly.

8. A machine according to claim 7 wherein the support is mounted on a cross beam of the frame beneath the jaws.

9. A machine according to claim 8, and further comprising guide means for guiding the assembly for its raising and lowering movements the cross beam being provided with openings in which components of said guide means are received.

10. A machine according to claim 9 wherein the guide means components are tubes and the support has rods slidably engaged in the tubes.

11. A machine according to claim 8, wherein the cross beam has a recess for receiving the rotary drive.

12. A machine according to claim 9 wherein the means for raising and lowering the assembly is at least one piston and cylinder unit connected between the cross beam and the support.

13. A machine according to claim 12, wherein the piston and cylinder unit has a cylinder extending through the cross beam.

14. A machine according to claim 1 and further comprising means for guiding the assembly for its raising and lowering movements.

15. A machine according to claim 1, wherein the means for raising and lowering the assembly is at least one piston and cylinder unit.

* * * * *